March 27, 1962 E. M. SCHAVERIEN 3,026,741
VALVE ACTUATING MECHANISM
Filed Dec. 16, 1959 4 Sheets-Sheet 3

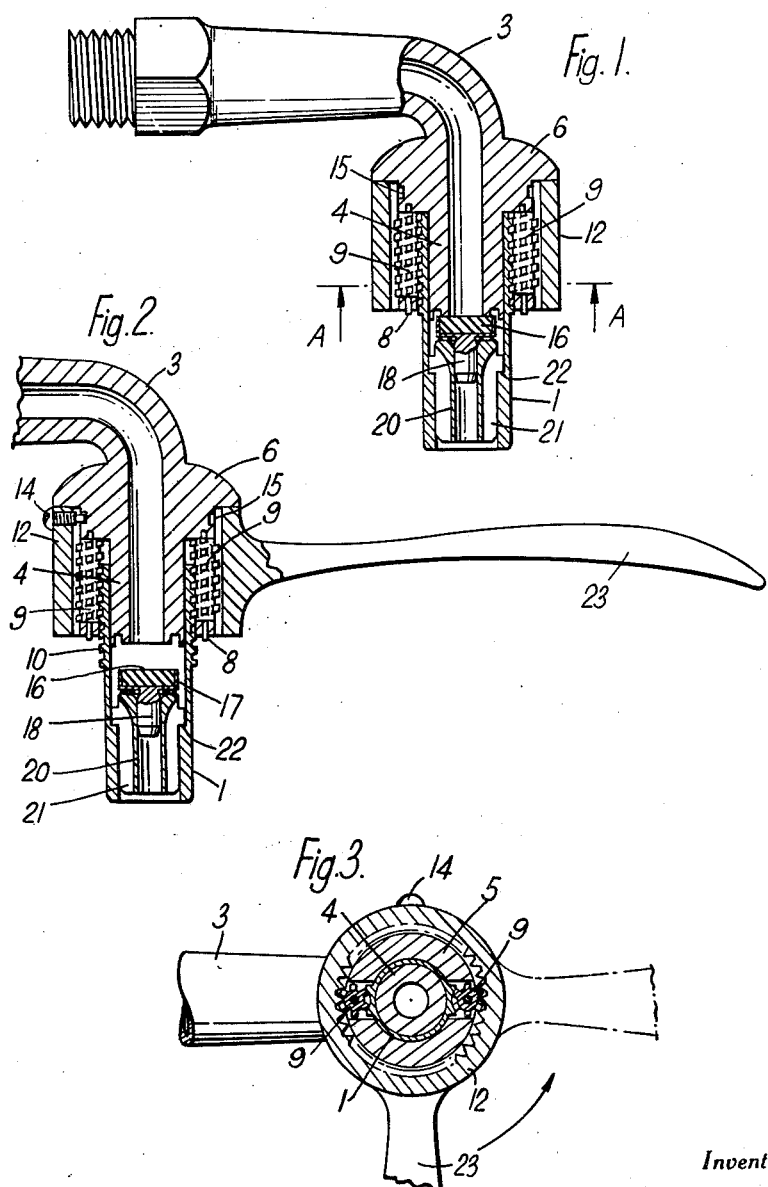

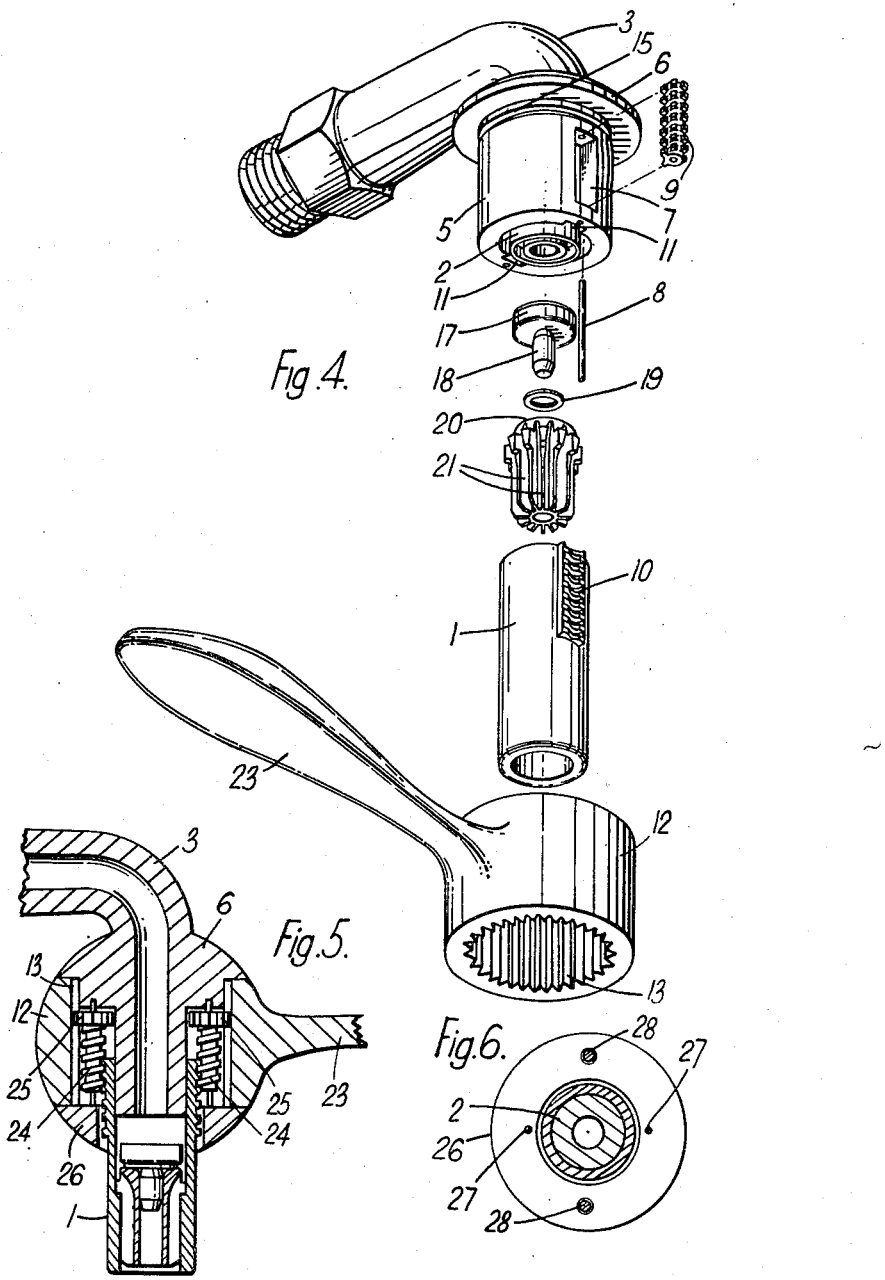

Inventor
EDWARD MOEY SCHAVERIEN
By Irwin S. Thompson
Attorney

March 27, 1962 E. M. SCHAVERIEN 3,026,741
VALVE ACTUATING MECHANISM
Filed Dec. 16, 1959 4 Sheets-Sheet 4
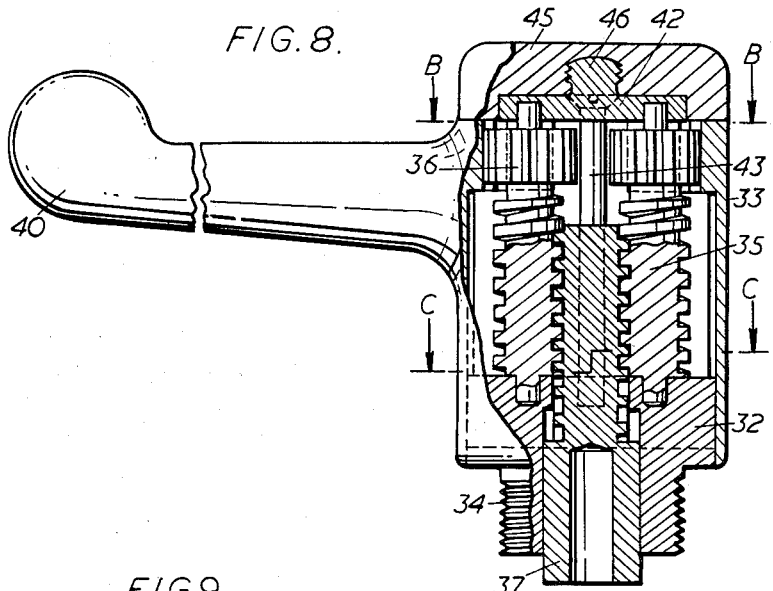
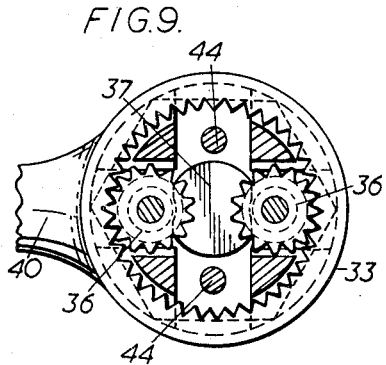
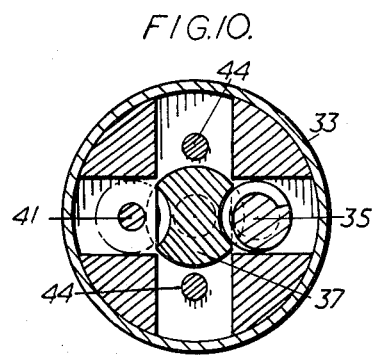
Inventor
EDWARD MOEY SCHAVERIEN
By Irwin S. Thompson
Attorney United States Patent Office 3,026,741
Patented Mar. 27, 1962

3,026,741
VALVE ACTUATING MECHANISM
Edward Moey Schaverien, 6 Canons Drive,
Edgeware, England
Filed Dec. 16, 1959, Ser. No. 860,017
Claims priority, application Great Britain Dec. 24, 1958
7 Claims. (Cl. 74—424.8)

This invention relates to valves or taps for fluid-flow control, and aims at the provision of a valve or tap suitable for use with pipes in which the fluid is under substantial pressure, and operable by comparatively small throw of the control means.

The invention consists in a valve or tap for liquid-flow control comprising gear-like means between an operating member and a carrier for a sealing member, whereby the sealing member can be removed axially of a liquid outlet to and from a sealing position in relation thereto.

The sealing member may be mounted in a tubular carrier having external rack means engaged by worm-like means which on rotation cause the carrier to move in an axial direction. The worm-like means may be rotatable by a surrounding sleeve or collar having internal teeth in mesh with the worm-like means, which may be longitudinally grooved to mesh with the teeth of the sleeve or collar. Preferably the sleeve or collar is provided with a projecting lever whereby it can be rotated to open and close the tap.

The invention will be clearly understood from the following description of one form (given, however, merely by way of example) which it may assume, and this description will be more readily followed by reference to the accompanying drawings wherein:

FIGURES 1 and 2 represent in side sectional elevation a valve or tap according to the invention, respectively in closed and open position;

FIGURE 3 is an underneath plan view along the line A—A of FIGURE 1;

FIGURE 4 is an exploded perspective view of the device; and

FIGURES 5 and 6 represent a side-sectional view, and an underneath plan view of part of, a modified form of tap according to the invention;

FIGURE 8 represents in axial section a slightly modified construction of a unit similar to that shown in FIGURE 7; and FIGURES 9 and 10 are plan sections respectively along the lines B—B and C—C of FIGURE 8.

Figure 7:
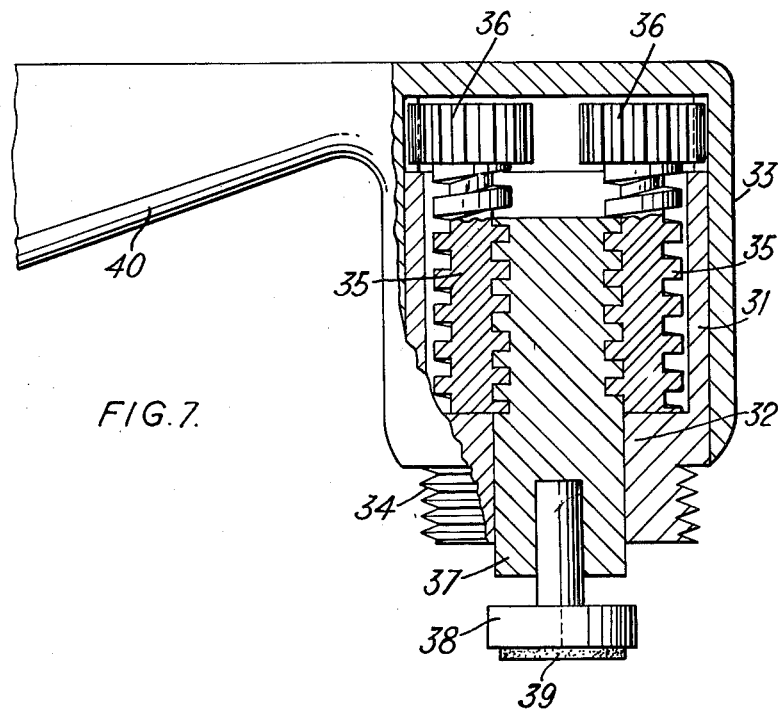
FIGURE 7 represents in axial section a valve unit according to the invention.

In carrying the invention into effect in one convenient manner, as shown in FIGURES 1–6 of the aforesaid drawings, a valve or tap for fluid-flow control (suitable, for example, for domestic or like water supply) comprises a tubular carrier member 1 slidably fitting into an annular slot 2 formed in the enlarged end of a pipe 3 (here shown as of L-shaped and screw threaded at its other end for connection to a conventional water-supply pipe). The slot 2 is co-axial with the bore of the pipe and extends inwards a substantial distance from the end of the pipe, dividing the enlarged end portion of the pipe into an inner post 4 surrounded by an outer collar 5. A flange extends radially from the pipe at the upper end of the enlarged end portion. The carrier 1 has a sliding fit on the post 4.

At diametrically opposite positions the outer collar 5 is formed with longitudinal slots 7 extending through the collar, and in each slot is rotatably mounted, by a pin 8, a gear-like roller element 9. Each element 9 is formed with a helical worm thread, which thread is broken by spaced longitudinal grooves so that in end view the element appears of gear-like cross-section.

At diametrically opposite points of the inner end of the carrier 1 are provided toothed racks 10, and when the carrier 1 is inserted into the annular slot 2 the rollers 9, on being rotated, mesh with the teeth of the racks 10. Internally the collar 5 may be slotted as at 11 to accommodate the racks 10, and serve as guides therefor. It will be apparent that when the carrier 1 is mounted in the slot 2 and the racks 10 in mesh with the rollers 9, rotation of the rollers, acting as worms, will cause an axial movement of the carrier 1.

A sleeve 12 with internal longitudinal teeth 13 is of such dimensions as to surround the above described end-assembly of the pipe with the teeth 13 in mesh with the longitudinal grooves of the rollers 9. The sleeve 12 abuts against the flange 6 and is rotatably held in position, e.g. by a screw pin 14 adapted to engage in an external slot 15 near to the upper end of the collar 5. It will be seen that rollers 9 effect axial movement of the carrier 1 as described above.

The carrier 1 houses sealing means for the outlet of the pipe 3. Such means may comprise a resilient disc 16 in a dish-shaped rigid, e.g. metal, casing 17 having an axial stem 18 fitting, with surrounding washer 19, into a tubular support 20 provided with spaced radial vanes 21 having a sliding fit into the carrier 1. Internally the carrier 1 is stepped, as at 22 forming a seating for projecting portions of the vanes 21, to retain the support 20 and sealing member 16, 17, 18 in the carrier.

It will be seen that by rotation of the sleeve 12 in one sense the carrier 1 is moved axially inwards of the slot 2 by rotation of the rollers 9, as described above, and brings the disc 16 into sealing position against the outlet of the pipe 3 (FIGURE 1), while rotation of the sleeve 12 in the opposite, tap-opening, sense moves the disc 16 away from the pipe outlet (FIGURE 2) and allows water to flow through, and out of, the carrier 1, flow being rendered smooth by the vanes 21. As shown the end of the pipe 3 may be provided with an annular groove coaxial with the outlet to accommodate the edges of the rigid disc-holder 17 when the disc 16 is pressed firmly against the pipe to seal the aperture.

Owing to the substantial ratio of the diameter of the sleeve to that of each roller 9 it will be seen that a comparatively small angular rotation of the sleeve effects much larger angular rotation of the rollers 9, and the pitch of the worm arrangement on the rollers is selected so that this results in substantial axial movement of the carrier 1. In other words the tap can be fully opened and closed by a small angular movement, e.g. of, say, 90°, of the sleeve 12. On the other hand the substantial meshing of threads between the rollers 9 and the racks 10 of the carrier 1 ensure that the sealing means and its assembly can withstand substantial liquid pressure in the pipe 3, both when closed and open. The features lend the above described assembly to operation by a lever (as used in hospitals but not heretofore for domestic or other purposes) and it is preferred that the sleeve 12 shall be provided with a radially extending lever 23 whereby it can be rotated.

In a modification of the invention shown in FIGURES 5 and 6 of the aforesaid drawings each roller 9 of FIGURES 1–4 is replaced by an element comprising a lower worm portion 24 with a continuous helical worm, and an upper gear portion 25. The worm meshes with the teeth of the slide 1 while the gear 25 meshes with the inner longitudinal teeth of the sleeve 12, and the slider 1, fitted with the seal, is raised and lowered, all as previously described, upon rotation of the sleeve 12. The sleeve 12 may be part-spherical, as shown, and is held against the upper flange 6 by a part-spherical base plate 26 so that the whole assembly assumes spherical shape. The rollers 24, 25 are rotatably mounted by pins at their upper ends which engage bores in the body of the tap, and pins 27 engaging the base plate 26, which latter is secured to the part 5 by screws in screw holes 28.

The invention may be incorporated in a unit adapted for fitment to existing taps where the flow-control elements are normally enclosed in a casing which screws into a tap body. One such form of the invention is illustrated in FIGURE 7 of the aforesaid drawings.

A fluid-flow control valve unit comprises a casing formed of a hollow cylindrical body 31, with an apertured base 32, on which body is fitted an inverted cylindrical cap 33 closed at its upper end. An extension from the base 32 is dimensioned and screw-threaded, as at 34, to screw into threaded aperture of a conventional tap, e.g. a water tap.

At diametrically opposite positions in the body 31 adjacent to the wall are rotatably mounted worms 35 each fitted, at its upper end, with a toothed gear-like wheel 36 and the inner wall of the cap 33 adjacent to its upper closed end is formed with teeth adapted to engage the wheels 36.

Extending axially into the body 31, and slidable in the aperture through the base of the body and its threaded extension, is a slide 37 having on opposite sides rack teeth which are engaged by the worms 35. In the lower end of the slide 37 is inserted the pin of a disc 38 on which can be mounted a washer 39. The cap may be formed with a lever 40 or the like whereby it can be rotated in relation to the fixed body 31.

It will be apparent that rotation of the cap 33 "drives" the wheels 36, and the worms 35 which cause axial movement of the slide 37, in order to move the disc 38 and washer 39 to and from the inlet end of a pipe through which fluid passes through the valve, in the same way as the washer of a conventional water tap. It will also be seen that the ratio between the cap 33 and wheels 36 is such that a comparatively small angular rotation of the cap 33 results in a comparatively large rotation of the worms 35 and thus a substantial throw of the washer 39 between open and closed positions. Nevertheless the gear, worm and rack arrangement is substantially irreversible, and ensures that the disc 38 and washer 39 in closed position will withstand a high fluid pressure without being forced open.

It will also be noted that the device described above forms a unit which can readily be fitted to existing taps and valves in replacement of the conventional knob-operated screw whereby the washer is opened and closed, in relation to the fluid inlet.

The construction of a slightly modified form of tap unit similar to that shown in FIGURE 7 is illustrated in FIGURES 8–10 of the aforesaid drawings.

The outer casing 33 is a cylinder open top and bottom, but with a reduced diameter at the upper end, and having integral with it the lever 40. The assembly removably insertable into this casing 33 comprises a base 32 with a downwardly extended tubular boss externally screw-threaded, as at 34, and an upwardly extending cylinder divided into four segments (FIGURE 10) by cruciform transverse axial slots. When the base 32 is fitted in the casing 33 the segments bear against the undersurface of the lip at the top of the casing 33. A slide 37, which at its upper end is formed with recessed rack teeth on opposite sides, is fitted into the tubular boss of the base, which is formed with bearing bores in each slot, equi-spaced from the axis. In the bores 41 forming one pair are inserted the end pins of worms 35, each integral at its upper end with a gear wheel 36, and end pins above these gear wheels are engaged by bores in a disc 42. In quadrature with these bores of the disc 42 are screwholes through which screws 43 are inserted and screwed into threaded holes 44 in the base 32, thereby holding down the disc 42 and rotatably holding the worm and gear elements 35, 36 in position, with the worms engaging the rack teeth of the slide 37. The teeth of the gears 36 mesh with teeth provided on the inner surface of the lip at the upper end of the casing 33 which thus forms an internal gear. The upper end of the unit is closed by a cap 45 which screws on to a threaded boss 46 upstanding centrally from the disc 42. The lower end of the slide 37 is bored to receive a washer as 38, 39 (FIGURE 7), and when the threads 34 are screwed into the body of a conventional tap this washer cooperates with the liquid outlet passage. It will be apparent that rotation of the casing 33 by the lever 40 causes the gears 36 to rotate thus driving the worms 35 and thereby raising or lowering the slide 37 to open or close the tap.

Owing to the step-up gear ratio employed the gears 36 rotate by a greater angle than the lever 40, and a comparatively small movement of the lever is sufficient to open and close the tap. The gearing and worm drive is substantially irreversible, and a tap such as described is very suitable for control of fluid flow from piping in which the fluid is supplied under substantial pressure.

If desired, spring means e.g. a coiled spring in the cap 45 (FIGURE 8), may be provided between the sleeve 33 and the fixed part of the casing to urge the sleeve 33 to tap-closing position when not held open by hand-operation of the lever 40.

From the above description it will be seen that the invention provides an efficient, long-wearing valve or tap for fluid-flow control, but it should be understood that the invention is not limited solely to details of the form described above, which may be modified, in order to meet various conditions and requirements encountered, without departing from the scope of the invention.

What I claim is:

1. A fluid-flow control valve comprising a rigid support, a hollow cylindrical outer casing rotatably mounted on said rigid support, and having integral internal teeth forming a comparatively large diameter internal gear, a slide axially reciprocable in said outer casing, rack means on opposite sides of said slide, a worm engaged with each of said rack means, a gear of comparatively small diameter rigidly associated with each of said worms, each of said small gears being located inside said outer casing and being in mesh with said internal teeth of said outer casing, means for mounting a washer in association with said slide, and means rigidly associated externally with said outer casing, operable to rotate said outer casing in relation to said rigid support, and thereby to rotate said worms by way of said meshed gearing, in order to move said slide and associated washer axially in relation to said outer casing.

2. A fluid-flow control valve according to claim 1 comprising guide means mounting said slide, and guiding said slide while it is being moved by said worms.

3. A fluid-flow control valve according to claim 1 wherein an abutment of said rigid support projects axially into said outer casing, and said slide is slidably mounted on said abutment.

4. A fluid-flow control valve according to claim 1 wherein said rigid support forms a closure for one end of said outer casing, and said slide is slidably mounted in an axial bore through said closure.

5. A fluid-flow control valve according to claim 1 wherein said rigid support comprises a base member fitting into one end of said outer casing, and having an externally-threaded, outwardly projecting axial boss adapted to screw into the threaded aperture of a conventional water tap.

6. A fluid-flow control valve according to claim 1 wherein the said rigid support comprises a base member having an upstanding cylindrical wall forming an inner casing, and the said outer casing fits externally telescopically onto said inner casing.

7. A fluid-flow control valve according to claim 1 comprising a base member constituting said rigid support, a cap member, and screw means holding said base member and said cap member together in spaced relationship, with said outer casing extending between said cap member and base member.

References Cited in the file of this patent

UNITED STATES PATENTS

| | | |
|---|---|---|
| 163,263 | Schofield | May 11, 1875 |
| 1,343,007 | Sauvage | June 8, 1920 |
| 1,944,979 | Hastings | Jan. 30, 1934 |
| 2,220,431 | Strehs | Nov. 5, 1940 |
| 2,266,485 | Williams | Dec. 16, 1941 |
| 2,343,134 | Cawood | Feb. 29, 1944 |

FOREIGN PATENTS

| | | |
|---|---|---|
| 53,787 | Sweden | of 1923 |
| 1,043,743 | Germany | Nov. 13, 1958 |